United States Patent [19]
Abe et al.

[11] Patent Number: 5,970,504
[45] Date of Patent: Oct. 19, 1999

[54] MOVING IMAGE ANCHORING APPARATUS AND HYPERMEDIA APPARATUS WHICH ESTIMATE THE MOVEMENT OF AN ANCHOR BASED ON THE MOVEMENT OF THE OBJECT WITH WHICH THE ANCHOR IS ASSOCIATED

[75] Inventors: Hironobu Abe; Junshiro Kanda; Koji Wakimoto, all of Tokyo, Japan

[73] Assignee: Mitsubishi Denki Kabushiki Kaisha, Tokyo, Japan

[21] Appl. No.: 08/674,788

[22] Filed: Jul. 3, 1996

[30] Foreign Application Priority Data

Jan. 31, 1996 [JP] Japan .................................. 8-014844

[51] Int. Cl.⁶ .................................................. G06T 1/00
[52] U.S. Cl. ........................... 707/501; 345/475; 345/328
[58] Field of Search ........................... 395/762, 173–175, 395/806, 807, 200.48, 200.49, 200.33, 200.79; 348/407, 415–418, 422; 707/500–501, 513; 345/326–328, 339, 346, 302, 333, 335

[56] References Cited

U.S. PATENT DOCUMENTS

| | | | |
|---|---|---|---|
| 4,383,272 | 5/1983 | Netravali et al. | 348/416 |
| 5,214,758 | 5/1993 | Ohba et al. | 395/173 |
| 5,416,899 | 5/1995 | Poggio et al. | 395/175 |
| 5,539,871 | 7/1996 | Gibson | 395/762 |
| 5,596,705 | 1/1997 | Reimer et al. | 395/326 |
| 5,617,144 | 4/1997 | Lee | 348/416 |
| 5,657,050 | 8/1997 | McCambridge et al. | 348/141 |
| 5,708,845 | 1/1998 | Wistendahl et al. | 345/302 |
| 5,774,666 | 6/1998 | Portuesi | 395/200.48 |

FOREIGN PATENT DOCUMENTS

| | | |
|---|---|---|
| 0596823 | 5/1994 | European Pat. Off. . |
| 3-52070 | 3/1991 | Japan . |
| 3-292571 | 12/1991 | Japan . |
| 4-163589 | 6/1992 | Japan . |
| 6-215047 | 8/1994 | Japan . |

OTHER PUBLICATIONS

English Language Abstract of Japanese Laid-open Publication No. Hei 4–163589.
"VDM: A Video Data Model for Handling Video Data in a Hypermedia System," Hajime Takano et al., pp. 4–221–4–222, 1993.
"A Method for Constructing Hypermedia Nodes from Objects that Appear in the Video Data," Hajime Takano et al., Human Interface, Proceedings of the Seventh Symposium on Human Interface, Oct. 23–25, 1991, pp. 301–306.
"A Navigation Style of a Video Hypermedia," Hajime Takano et al., Human Interface, Proceedings of the Eighth Symposium on Human Interface, Oct. 21–23, 1992, pp. 607–612.
"Implementation of a Distributed Video Hypermedia System," Kyoji Hirata et al., Tokyo, Dec. 8–9, 1994, pp. 165–173.
"VideoReality: A Flexible Video Observation System with Controlling Viewing Field," Fumiaki Miura et al., NTT Information and Communication Systems Labs, pp. 3–329–3–330 (w/translation), 1995.
"An Object Model for Video Information Systems," Seiichi Kon'ya et al., NTT Information and Communication Systems Labs, pp. 3–331–3–332 (w/translation), 1995.

(List continued on next page.)

*Primary Examiner*—Joseph H. Feild

[57] ABSTRACT

A moving image anchor setting apparatus including a data operation portion for executing data operation relating to setting of anchors and links; a data storage portion for storing the data; a display portion for controlling display; and a user operation portion for inputting editing commands. When anchors are set for some frames with an anchor setting portion, an anchor information interpolation portion estimates anchor information of the other frames. As a result, the number of man-hours required for anchor setting is greatly reduced.

16 Claims, 11 Drawing Sheets

OTHER PUBLICATIONS

V. Burrill, T. Kirste & J. Weiss "Time–Varying Sensitive Regions in Dynamic Multimedia Objects: Pragmatic Approach to Content–Based Retrieval From Video" Information & Software Technology 1994.

T. Satou & M. Sakauchi "A New Type Hypermedia Platform for Industrial Applications" Institute of Industrial Science, University of Tokyo, Japan, 1993.

D. Lowe & A. Ginige "HyperImages: Using object Recognition for Navigation Through Images in Multimedia" School of Electrical Engineering, University of Technology, Syndey, Australia, 1995.

IBM Technical Disclosure Bulletin, Apr. 1994 "Multimedia Hypervideo Links for Full Motion Videos".

Y. Tonomura "Video Handling Based on Structured Information for Hypermedia Systems" Nippon Telegraph & Telephone Corp. Kanagawa, Japan, 1991.

V–Active User's Guide, 1996–1997, San Franscisco, CA.

| ANCHOR ID | FRAME NO. | $x_1$ | $y_1$ | $x_2$ | $y_2$ |
|---|---|---|---|---|---|
| anchor 1 | 1 | 50 | 50 | 100 | 100 |
| | 100 | 70 | 80 | 110 | 110 |

| ANCHOR ID | FRAME NO. | $x_1$ | $y_1$ | $x_2$ | $y_2$ |
|---|---|---|---|---|---|
| anchor 1 | 1 | 50 | 50 | 100 | 100 |
| | 50 | 80 | 70 | 100 | 80 |
| | 100 | 70 | 80 | 110 | 110 |

| ANCHOR ID | LINK FORMAT | LINK INFORMATION |
|---|---|---|
| anchor 1 | text | anchor 1. txt |
| anchor 2 | image | anchor 2. bmp |

Fig. 8

MOVING IMAGE ANCHORING APPARATUS AND HYPERMEDIA APPARATUS WHICH ESTIMATE THE MOVEMENT OF AN ANCHOR BASED ON THE MOVEMENT OF THE OBJECT WITH WHICH THE ANCHOR IS ASSOCIATED

BACKGROUND OF THE INVENTION

1. Field of the Invention

The present invention relates generally to a moving image anchoring apparatus and a hypermedia apparatus employing this apparatus, and more particularly to an apparatus for inputting a moving image and setting an anchor to targets and suchlike included in said moving image and to a moving image hypermedia apparatus for linking related information to an anchor set by this apparatus and executing functions such as intended retrieval.

2. Description of the Prior Art

Generally in previous hypermedia apparatus the retrieval of information has taken the form whereby a logic unit for linking is created mainly for text or stationary images, the related information is linked to this logic unit, and when the user has clicked this logical unit, the related information is displayed. However, as for example is represented by MPEG relating to the coding and decoding of moving images, in recent years various techniques have been proposed for processing not only stationary images but also moving images. By handling moving images, the range of contents which can be created in the above hypermedia apparatus such as CAI, many types of presentation and electronic catalogs is expanded. Hitherto the use of editing of moving images has been somewhat limited to the industrial field such as broadcasting stations, but in the future it is expected rapidly to become widely available as a system for private use based on personal computers.

Japanese Patent Application No. Hei 4-163589 discloses an image processing apparatus capable of setting logical units (therein referred to as "nodes") for moving images. In respect of the problem that setting of nodes for a stationary image is possible only with a specified display range, for a moving image this apparatus concentrates on (1) display range and (2) time, specifying the valid continuity period of the nodes and regional range and is an apparatus in which such specification is possible. Thus for (1) by pointing out with a mouse etc. the regions surrounding a subject appearing in a moving image the node at that time is set; on the other hand for (2) the valid continuity period of the node is specified according to the time elapsed since the start of the output of the moving image. Therefore this node is determined uniquely according to the region and the time elapsed, and a link can be made for the related information to each node. After a link is made, when the moving image is actually played, if the user clicks a region on the screen with a mouse etc., a node is pinpointed according to the position and time and the related information is displayed.

SUMMARY OF THE INVENTION

In the above apparatus the setting of regions of logical units was performed manually. However, a moving image differs from a stationary image in that there are of course many frames and the position and shape of the subject are constantly changing. In the NTSC system 30 frames are required for 1 second and so even a simple calculation shows that when processing a moving image for 1 second, 30 settings would be required per 1 logical unit. For example, when creating contents lasting 5 minutes, if 5 logical units are set for 1 frame, the number of settings would amount to 45,000. In consideration of these points it is the object of the present invention to provide an apparatus which allows labor-saving and simplification in the setting of logical units (called "anchors" in the present claim) and more particularly an apparatus for automatically calculating or setting anchor information which has hitherto needed to be carried out for each frame.

(1) The moving image anchor setting apparatus of the present invention is an apparatus to set an anchor to an inputted moving image, and includes a frame specification portion for specifying a start frame and an end frame of the anchor setting period from a plurality of frames which make up an inputted moving image, an anchor setting portion for setting an anchor relating to an anchor region when corresponding anchor regions in a specified start frame and end frame have been specified, and by treating the start frame and end frame as standard frames for estimating, an anchor estimating portion to estimate the anchor information for a non-standard frame existing between these frames, based on the information of the anchor set at these frames.

Here, "frame" refers to a display unit of an image, a concept including a picture in MPEG or the like. "Anchor" refers to a logical process unit constituted by a given region on a screen. "Anchor information" refers to information which can be expressed numerically such as for instance the position or shape of an anchor region, and the color when an anchor region is visibly displayed. An anchor is uniquely determined according to anchor information or in some cases according to the anchor name. "Corresponding region" refers to an anchor region relating to an identical anchor. Ordinarily, since the setting targets of the anchor are moving at the start frame and the end frame, the anchor region should also move. Therefore, even for an single anchor information is specified in no less than 2 frames. These are premises of the present aspect.

In this aspect, the moving image to be processed is inputted. Since the moving image is comprised of a plurality of frames, from among these frames a start frame and an end frame for the period during which an anchor is to be set (hereinafter, "anchor setting period") are specified. In other words, the period from the start frame to the end frame is the valid existence period for that anchor.

Next a corresponding region for the start frame and the end frame is specified and an anchor for this region is set. At this stage, anchor information such as the anchor position for the given frames existing between these frames (hereinafter referred to simply as "non-standard frames") is unknown. The start frame and the end frame are treated as standard frames, and the anchor information is estimated based on information of the anchor set at these frames. Hereinafter the start frame and the end frame are referred to together as the "two outer standard frames."

According to a moving image anchor setting apparatus of the present invention anchors need only to be set at a start frame and an end frame and man-hours required for an anchor setting operation can be greatly reduced.

(2) In (1), in one aspect of the present invention the anchor estimating portion estimates the anchor information for the non-standard frame by interpolating the information of the anchor set at the start frame and the information of the anchor set at the end frame. In the simplest case linear interpolation is acceptable, or depending on the content of the moving image, non-linear interpolation can be used.

In this case, anchor information of a non-standard frame is estimated by interpolation of anchor information and so the necessary anchor information can be obtained with a simple calculation.

(3) In (2), in one aspect of the present invention the anchor estimating portion executes interpolation by the following procedure. First, an amount of variation in the corresponding information between the anchor set at the start frame and the anchor set at the end frame is calculated, then the ratio of the time-lapse from the start frame to the non-standard frame, to the time-lapse from the non-standard frame to the end frame is calculated. After this, the amount of change is divided according to this ratio. "Corresponding information" refers to information such as the two coordinates of the left upper points of the anchor regions set at the start frame and the end frame, and the two color codes of the anchor regions set at the start frame and the end frame.

In this case, anchor information is estimated according to an interior division calculation from the amount of change in corresponding information between anchors and so this calculation can be rendered considerably less troublesome.

(4) In cases (2) and (3), in one aspect of this apparatus an anchor information editing portion is also included for adding revisions to estimated anchor information about the non-standard frames. At this time the anchor information portion promotes a non-standard frame of which the anchor information has been revised to the standard frame. Hereinafter this frame is referred to as a "middle standard frame." Once a frame has become a middle standard frame it is used to estimate anchor information for other frames. If another non-standard frame X now exists between start frame A and middle standard frame B, for instance, the interpolation in (3) is executed based on the position of X between A and B. Or if another non-standard frame X now exists between middle standard frame B and end frame C, for instance, the interpolation in (3) is executed based on the position of X between A and B. If a plurality of middle standard frames is generated, interpolation is executed in the same way between the adjacent standard frames.

When anchor information has been revised, in a case in which this is to be automatically promoted to a standard frame, a more accurate estimation is now made possible. The user need not be concerned with the replacement of standard frames.

(5) In cases (1)~(4), in one aspect of the present invention the anchor setting portion includes an automatic anchor setting portion. This automatic anchor setting portion selects a given number of frames from the anchor setting period as new standard frames. There are no particular rules for selection, but for instance a standard frame may be chosen every 5 frames. After this, by tracing the position of the anchor using the movement of the outline of the target as a pointer, the anchor information for the standard frame is set automatically.

In this case, the time needed for the user to revise the anchor information is reduced.

(6) In cases (1)~(4), in one aspect of the present invention, instead of using the outline information in (5) the anchor information for the standard frames is set automatically by tracing a position of an anchor using the vector of the outline of the target as a pointer.

In this case also, the time needed for the user to revise the anchor information is reduced.

(7) In (6) in one aspect of the present invention the automatic anchor setting portion first deems all the sections of the anchor setting period which are partitioned or divided by the standard frames to be unit judgment periods. Then for each of the paths which are possible to be followed by the anchor within the anchor setting period, the level of agreement between the path and the anchor movement vector is judged at each unit judgment period. For instance, 1. including both ends there are three standard frames D, E, F
2. each of these standard frames is divided into n block regions
3. considering a model in which each block moves to an identical block in a different frame or to a different block, all paths will be less than $n^3$ (those paths which are not $n^3$ have been restricted by the first position and final position of the anchor). Now for all paths the agreement level between the path line and the movement vector of blocks including the anchor is judged at the 2 unit judgment periods D~E, E~F, and the judgement results are combined for the entire anchor setting period D~F. Finally the path having the highest agreement level in the combined results is taken as the movement path for the anchor.

In this case, the level of agreement between a movement vector and a supposed path is under consideration and so the influence of the difference accompanying the movement vector can be decreased.

(8) In case (7) in one aspect of the present invention the agreement level is a function for an angle formed by the path and the movement vector, and the function does not have an extremum, that is a maximum value or a minimum value, while the angle x changes from 0° to 180°, and the combining is executed by calculating the sum total of the values of the function determined for each of the unit judgment periods.

Because the function does not have an extremum, when the angle changes from 0° to 180° the function values gradually increase or decrease. Now the agreement level is evaluated according to the simple addition of these values. An example of this function would be y=x, y=cos (x).

In this case, the level of agreement is expressed by a function of the angle formed by a supposed path and a movement vector and so numerical evaluation of the level of agreement is possible.

(9) In cases (5)~(8), in one aspect of the present invention for all the sections of the anchor setting period which are partitioned by the standard frames the anchor estimating portion executes interpolation calculation of the anchor information between the standard frames positioned at both ends of the section, and estimates the anchor information for the non-standard frames included in the section. For instance, as the frames are referred to as frame 5, 10 . . . when there is a standard frame every 5 frames, interpolation calculation is executed for frames 6 and 7 etc.

In this case, anchor information at a non-standard frame is estimated and so anchor information for all frames can be obtained.

(10) In another aspect of the present invention, in (5)~(9) the anchor setting portion includes a standard frame deletion portion, and when the anchor information for a certain standard frame is obtainable having the designated permissible deviation value of error from the interpolation calculation of the anchor information in other standard frames, this standard frame deletion portion demotes the relevant standard frame to a non-standard frame. This permissible value is determined according to such points as the content of the moving image and user specifications. The anchor of the demoted frame is thereafter calculated from the anchor position information of other standard frames.

In this case, an unnecessary standard frame is deleted and so the calculation and amount of memory required can be decreased.

(11) In one aspect of the present invention, in one of the moving image anchor setting apparatus the anchor setting portion includes a text anchor setting portion, and this text anchor setting portion sets an anchor containing a text when a corresponding text has been specified in the start frame and in the end frame. "Corresponding text" refers to a text which must be included in an identical anchor. In this aspect for instance an anchor region is set so as to surround the text.

In this case, the number of targets set with links is increased and re-editing is simple.

(12) In another aspect of the present invention, one of the moving image setting apparatuses also includes a cursor replacement portion to replace the display state of the cursor when the cursor has entered a given anchor region.

In this case, anchor specification by the user is simple.

(13) At this time the cursor replacement portion can replace the cursor display state so as to accompany the display of the name of the anchor region into which the cursor has entered. For instance, design can be such that when the cursor has entered an anchor region "Person A" the cursor changes to a "Person A" display text.

If the name of the anchor region into which the cursor has entered is displayed, a certain amount of related information can be known without needing to be clicked.

(14) The hypermedia apparatus of the present invention is equipped with one of the above moving image anchor setting apparatuses, an anchor information memory portion for storing anchor information which has been set by the anchor setting portion, a link setting portion for linking stored anchor information with given related data, and a link retrieval portion for retrieving from a given anchor related data linked to that anchor.

In this aspect, the anchor information set by the moving image anchor setting apparatus and the given related data acquire a relation through linkage. At this time, for instance by clicking the anchor displayed on the screen the related information can be retrieved.

According to the hypermedia apparatus all characteristics of the moving image apparatus can be utilized. Wide improvements in the efficiency of operations performed by the user such as creation of contents become possible.

BRIEF DESCRIPTION OF THE DRAWINGS

FIG. 8 is a diagram depicting a link information table in the first embodiment.

DESCRIPTION OF THE PREFERRED EMBODIMENTS

A preferred exemplary embodiment of a moving image hypermedia apparatus of the present invention will now be described. A moving image anchor setting apparatus of the present invention is utilized in this apparatus. According to the present apparatus, for instance with a moving image of an aquarium water tank, CAI software can be simply and effectively created so that when a given fish swimming in the tank is clicked, such information as the name of the fish and a supplementary explanation can be displayed. Hereafter "user" mainly refers to a creator of such contents but it is of course applicable to someone who individually edits a video tape filmed by himself.

EMBODIMENT 1

In this embodiment an apparatus is described which, based on an anchor region specified at a start frame and end frame by a user, automatically works out anchor information such as the position, shape and color of an anchor region at another frame by interpolation calculation.

Figure 1:
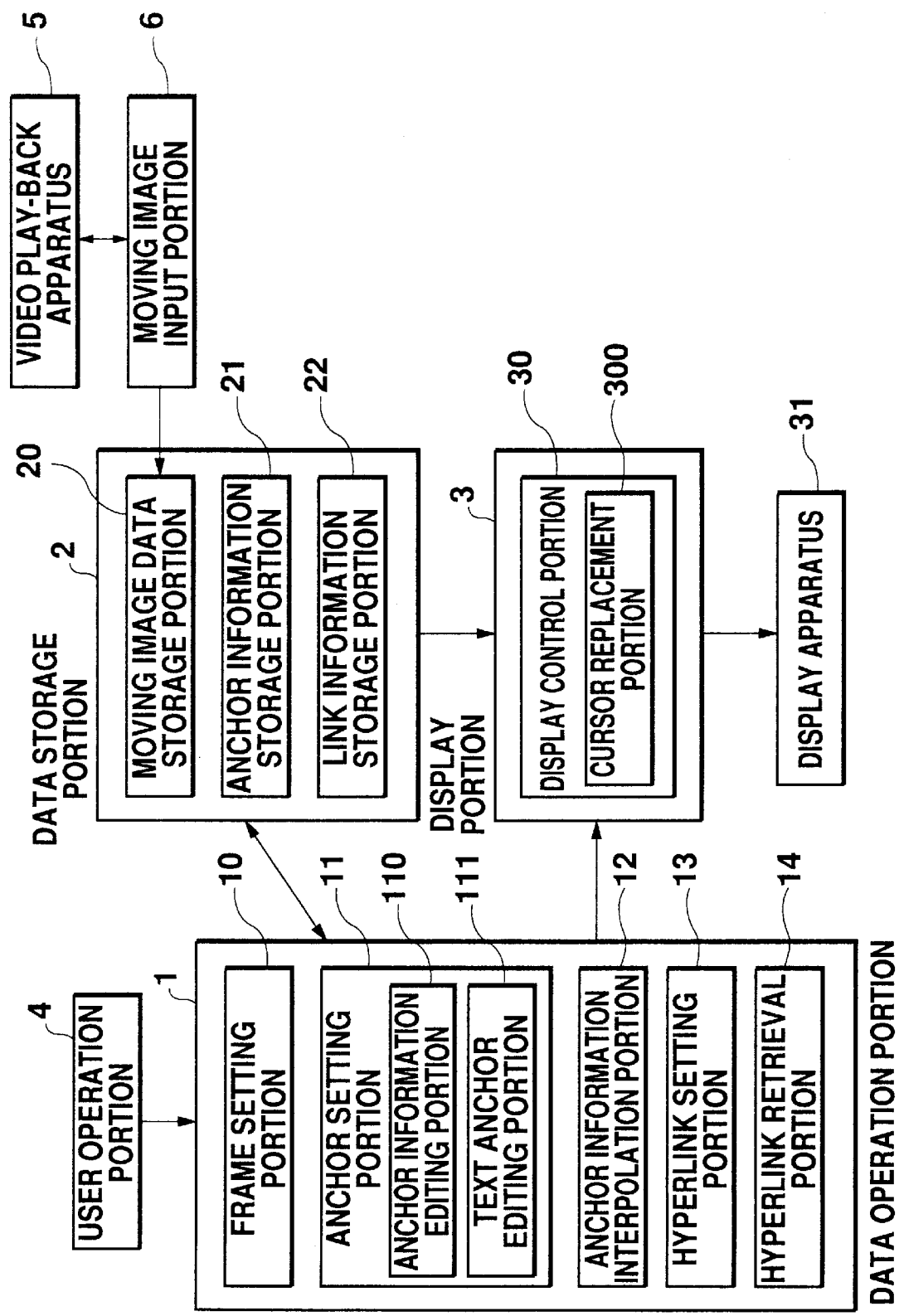
FIG. 1 is a block diagram of a system including a moving image hypermedia apparatus in a first embodiment.

The complete system which includes a moving image hypermedia apparatus of this embodiment comprises a personal computer (hereinafter PC) which controls anchor and link setting processing, and a video play-back apparatus providing a moving image to this PC. This PC has a built-in video capture-board to supplement and digitize the image provided from the video play-back apparatus. The video play-back apparatus is capable of functions such as play-back from a specified frame or time in addition to the usual functions such as play-back, stop, fast-forward and pause. This type of video play-back apparatus is widely used by broadcasting stations and the like but of course it is not restricted to these. Control of the various functions of the video play-back apparatus is carried out with the aid of a user interface (hereinafter UI) deployed on the PC, for instance "Play Button" is displayed on the screen. In this case, when the user clicks this button, the action is transmitted via a signal cable from the PC to the video play-back apparatus. The video play-back apparatus itself is not a requisite constituent of a moving image hypermedia apparatus but is included in the system described here. FIG. 1 is a block diagram of a system including a moving image hypermedia apparatus according to this embodiment.

The present apparatus divides broadly into a data operation portion 1 for operating data relating to anchor information and link information, a data storage portion 2 for storing this data, a display portion 3 for displaying this data in a recognizable shape, a user operation portion 4 for carrying out receipt and management of user operations, a video play-back apparatus 5 on which is played a moving image inputted by a moving image input portion 6.

(1) Data Operation Portion 1

Instructions from the user to the data operation portion I are carried out by a UI to be explained later. Thus the internal construction referred to hereinafter is a software module.

The user inputs specification of a start frame and an end frame for a specified frame portion 10. The example of the start frame and end frame shows the first and last frames of a scene showing a fish tank from the above-mentioned film of an aquarium. If the scene were to move temporarily to a film of the entrance of the aquarium, thereafter since there would be no need to set an anchor for the fish the end frame would be specified before the movement of the scene.

An anchor setting portion 11 actually sets the anchor between the start frame and the end frame. For instance when an anchor is set for a fish, first at the start frame a rectangle enclosing the fish is displayed using a mouse and registered as an anchor region. At this time the moving image is in the stop mode. Next the moving image is continued as far as the end frame where the same fish is enclosed a second time and an anchor region is registered. Since the fish is moving and changing direction between the start frame and the end frame its position and shape usually change. As a result, the shape and position of the anchor region registered at the start frame and the shape and position of the anchor region registered at the end frame do not generally match. The anchor setting portion 11 therefore includes an anchor information editing portion 110 to be explained below for use when revising an anchor, and a text anchor editing portion 111 to set an anchor for text such as a character string.

An anchor information interpolation portion 12 executes interpolation calculation based on the information of the anchors set at the start frame and the end frame, and estimates the size and position of an anchor at a given frame (a non-standard frame). This process will be explained in detail below. A hyperlink setting portion 13 executes setting of a hyperlink to an anchor that has been set and generates structured data relating to the setting in the form of a table. A hyperlink retrieval portion 14 executes retrieval of set link information. In the above examples the fish anchor and the text data and the like showing the name of the fish are connected by a hyperlink.

(2) Data Storage Portion 2

The data storage portion 2 may be a database, any type of file apparatus or memory apparatus. This is a hardware part.

A moving image storage portion 20 stores moving image data which has been captured at a moving image input portion and digitalized. An anchor information storage portion 21 and a link information storage portion 22 respectively store anchor information and link information.

(3) Display Portion 3

A display control portion 30 includes a display system program which generally controls the display of all types of image such as moving images during editing or UI, a display circuit such as a VGA controller and a driver for this. The display control portion 30 has a cursor replacement portion 300 . The cursor replacement portion 300 replaces the display state of the cursor when the cursor has entered an anchor region. The output data of the display control portion 30 are allocated to a display apparatus such as a PC monitor and the intended display is executed.

(4) User Operation Portion 4

The user operation portion 4 allows the input of commands from a user, and comprises a keyboard, mouse, or any type of pointing device hardware and a command dispatcher. Anchor setting, revision of an anchor region, linking and link retrieval are examples of commands.

(5) Moving Image Input Portion 6

The moving image input portion 6 is a piece of hardware equivalent to a video capture board, having an AD converter and a frame memory (not shown in the drawings) for digitalizing an inputted moving image. The data is then provided to the moving image data storage portion 20.

First the procedure for setting anchors and links will be explained and then the UI state for anchor setting will be explained.

[1] Anchor Setting

Figure 2:
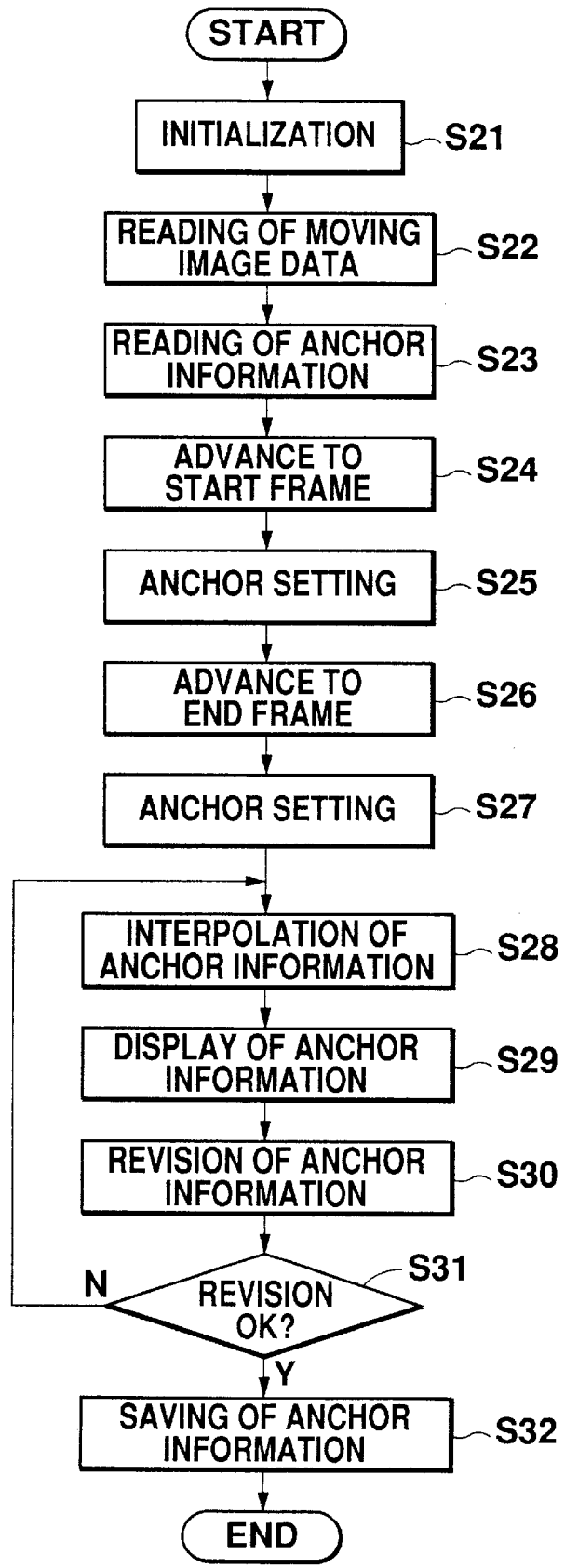
FIG. 2 is a flowchart showing an anchor setting and revision procedure according to the first embodiment.
Figures 3, 4:
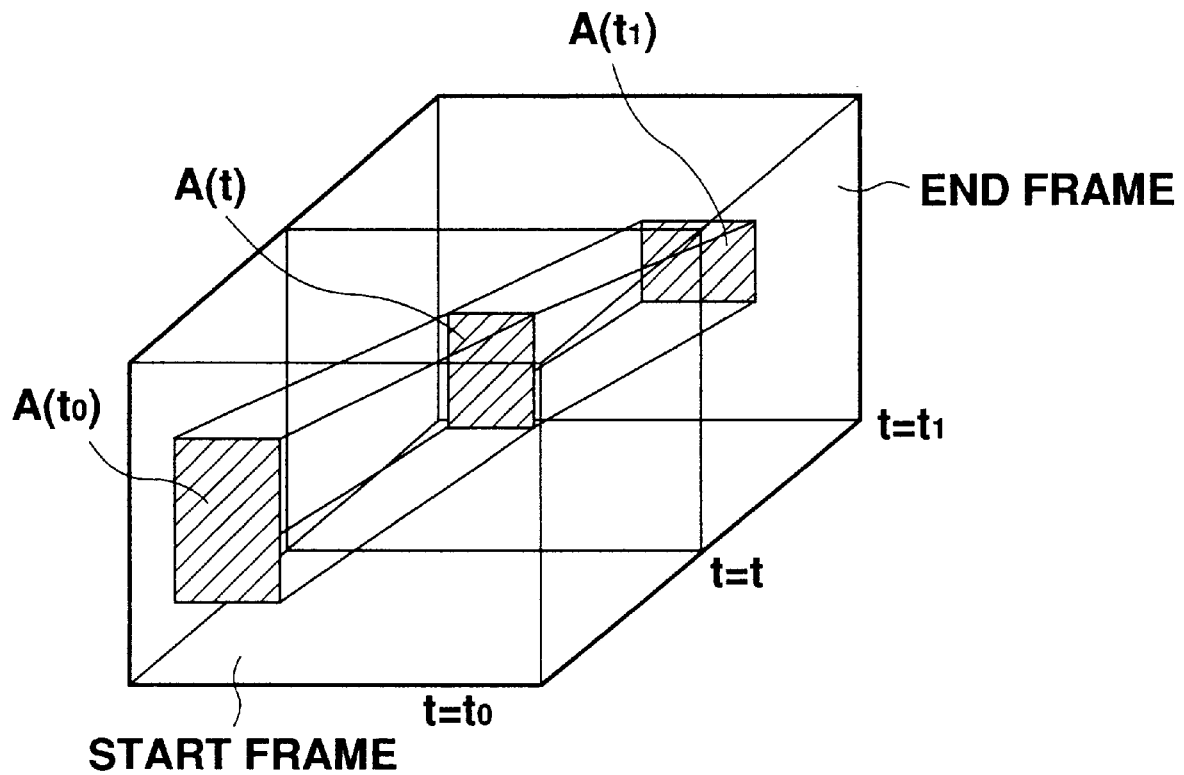
FIG. 3 is a diagram depicting a table of anchor information set in the first embodiment.
FIG. 4 is a diagram depicting an interpolation calculation method for anchor information according to the first embodiment.

FIG. 2 is a flowchart showing the anchor setting and revision procedure according to the present embodiment and FIG. 3 is a diagram showing a table of information for a set anchor. As FIG. 2 shows, various kinds of initialization processing are first executed (S21) with respect to the hardware, and the moving image data stored in the moving image data storage portion 20 are incorporated (S22). The front frame of the incorporated moving image data is first displayed as a stationary image on a display apparatus 31.

Next anchor information which has already been set for this moving image data is incorporated from the anchor information storage portion 21 (S23). If anchor information exists, its anchor region is actually displayed on the screen (hereinafter the mode wherein an anchor region is displayed on the screen is referred to as the "anchor display mode", and the mode wherein an anchor is not displayed as the "anchor non-display mode").

Following this, the moving image data are advanced to the start frame of the time period in which a new anchor is to be set (S24), and when the desired frame appears, the "start frame" button on the screen is pressed and the start frame is registered. This is now in the waiting state for the setting of the anchor region at this frame, and when the user for instance encloses another fish by clicking the mouse, a rectangular region is set. When the rectangular region is fixed, the coordinates of the left upper points (x1, y1) and right lower points (x2, y2) are obtained and recorded as anchor information together with the frame number (numbered consecutively from the front frame of the moving image) of the start frame (S25).

After this, the moving image data are again advanced and stopped when the desired end frame appears (S26) and a rectangular region encircling the same fish is set. Here the setting of the anchor region at the end frame is completed (S27). In FIG. 3 "anchor 1" is the anchor ID showing this fish. The frame numbers of the start frame and end frame (frames 1 and 100 respectively) and the coordinates information for the anchor region are here contained in table form.

When the anchor information at the two outer standard frames has been determined in this way, the anchor information for a frame between them is obtained by interpolation calculation (S28). FIG. 4 is a diagram showing the interpolation calculation method of anchor information. Here, with anchor information A (t0) at start frame (time t0)
anchor information A (t1) at end frame (time t1)
anchor information A (t) at time t $$t1-t0=\Delta t$$

then $$A(t)=\{A(t1)-A(t0)\}t/\Delta t+\{A(t0)t1-A(t1)t0\}/\Delta t \quad \text{(equation 1).}$$

The external shape of the anchor region at a given time is ascertained by substituting A with the x1, y1, x2, y2 values. The general movement of the anchor region is ascertained by substituting the central coordinates of the anchor region. If A is substituted with a color number, a utilization method wherein the color of the anchor region changes becomes possible. In addition, by internal calculation using equation 1 in a similar way it is possible to interpolate information which can be expressed numerically. Anchor information for a non-standard frame obtained through interpolation may be added to "anchor 1" region automatically in FIG. 3 or equation 1 calculation for a frame may be carried out each time the display of a frame is prescribed by the user.

When S28 is completed, the anchor information is actually displayed and the contents are confirmed. Now returning to the start frame the moving image data is played and the anchor region is displayed at each frame by a rectangle. This rectangular region moves continually in compliance with the calculation results.

Figures 5, 6:
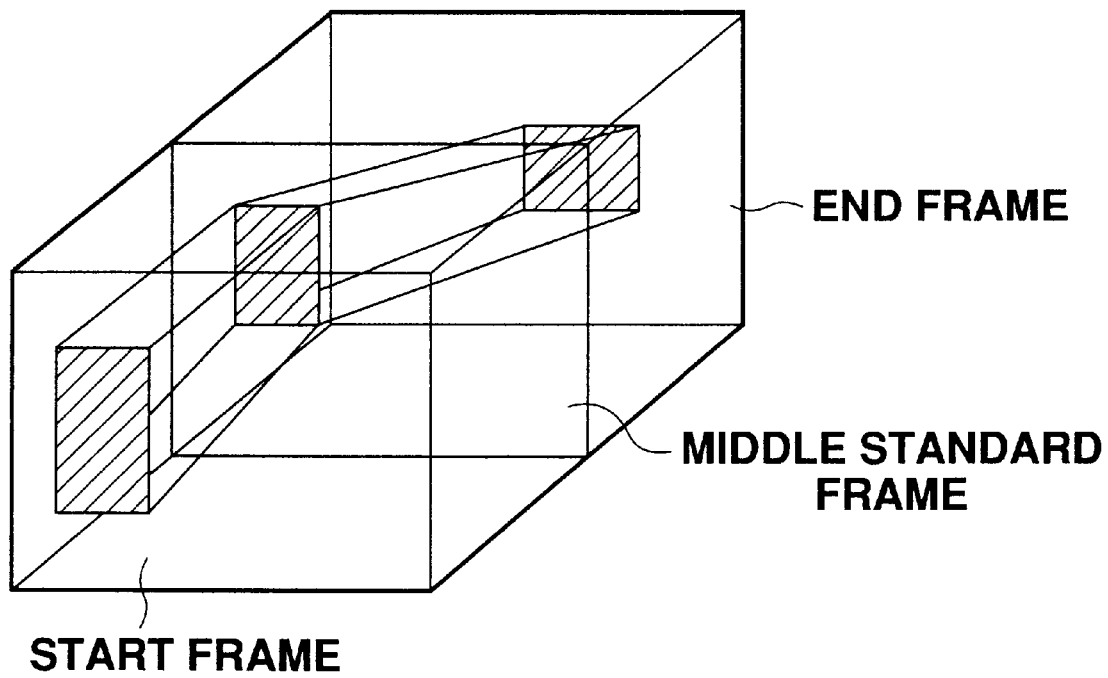
FIG. 5 is a diagram depicting a table obtained by adding anchor information of a middle standard frame to FIG. 3.
FIG. 6 is a diagram depicting a method of executing interpolation calculation based on the middle standard frame in the first embodiment and two end standard frames.

In the case of "anchor 1" an extremely good result is achieved when the fish moves with constant velocity in a straight line, but in a case where the fish changes direction midway, it is envisaged that at a midpoint frame the anchor region might become misaligned from the fish. In this embodiment in such a case the anchor information is revised. The user first advances the moving image data to a frame with large misalignment and stops the image here. Next, the user clicks the edge portion of the anchor region displayed on the screen and alters the shape or position of the region using the mouse. An anchor information interpolation portion 12 promotes a frame revised in this way to a middle standard frame and this anchor information is added to the table in FIG. 3. FIG. 5 shows the table obtained when the anchor information of the middle standard frame is added to FIG. 3.

FIG. 6 is a diagram depicting the interpolation calculation method based on the two end standard frames and the middle standard frame. If the non-standard frame which is the estimate target exists between the start frame and the middle standard frame, interpolation calculation is executed between those frames, and if the non-standard frame exists between the middle standard frame and the end frame, interpolation calculation is executed between those frames (S28). Thereafter, following display in S29 and re-revision in S30 when satisfactory anchor information is obtained (Y of S31) and preserved (S32) the anchor setting process is ended. When an anchor of another frame is revised in S30, of course this frame also becomes a middle standard frame. When two or more anchors are set for a single frame at S25, while automatically replacing the anchor ID according to the setting order within the apparatus, the rectangles of these anchor regions may be displayed in differing colors.

The above procedures produce the following results:
1. In the most minimal case, the anchor setting is executed only at the two outer standard frames and setting operation for the many frames existing between these is not necessary.
2. When a misalignment of the anchor position has during interpolation calculation developed, this misalignment can be confirmed. Therefore, since frames needing to be revised are easily identified and once a frame has been revised it is automatically promoted to a middle standard frame, the user need not worry about matters such as whether or not to use a standard frame.
3. For instance even in a case in which a fish for which an anchor has been set swims in an arc, if revision is executed for just a few frames in addition to the two outer standard frames, it will be possible to obtain sufficiently good anchor information.

The above is an outline of the moving image hypermedia apparatus in the present embodiment and in particular of the moving image anchor setting apparatus.

[2] Link Setting

Figure 7:
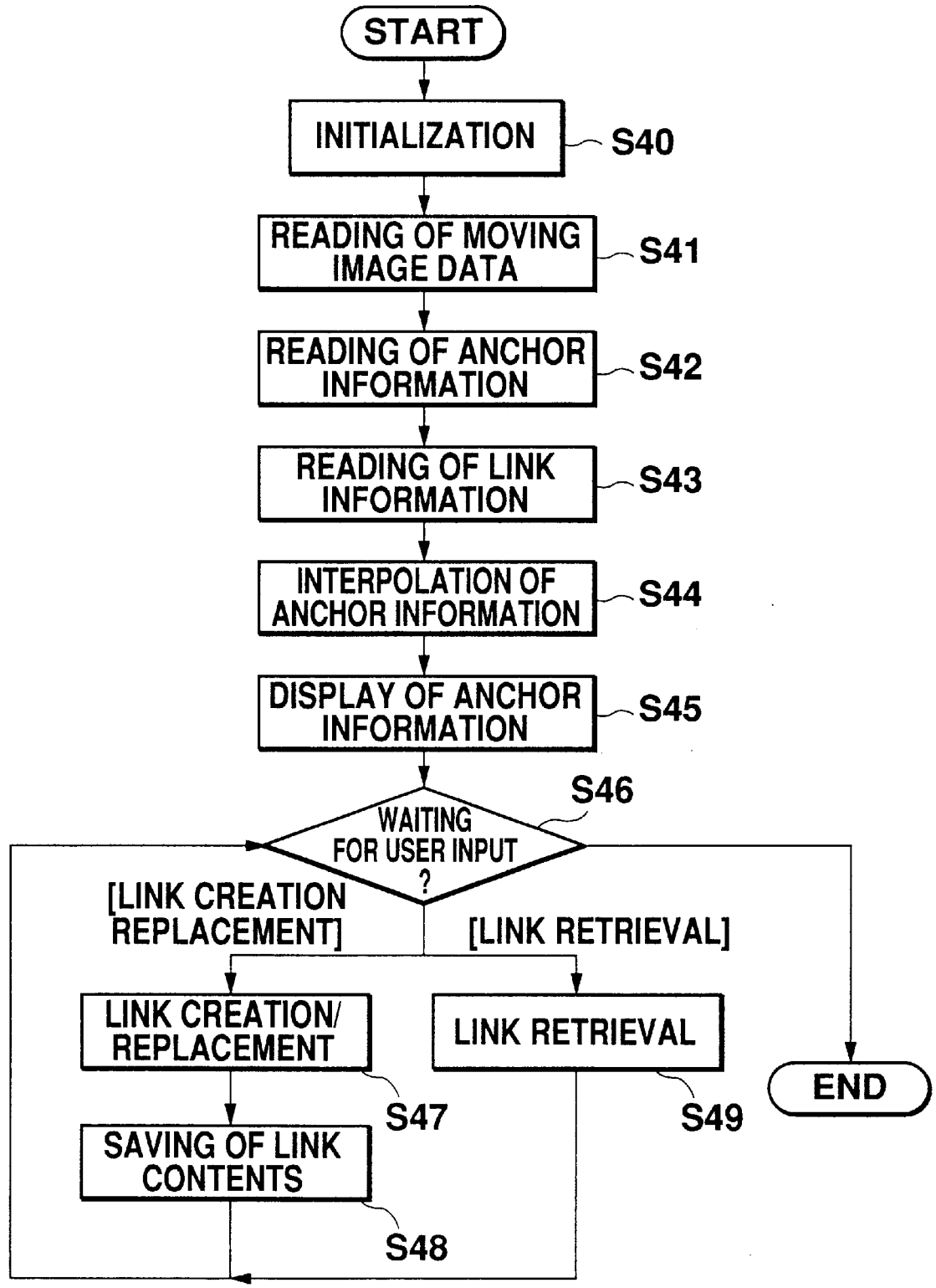
FIG. 7 is a flowchart showing a link setting and retrieval procedure according to the first embodiment.

Description will now be given of link setting for an anchor that has been set. FIG. 7 is a flowchart showing the link setting and retrieval procedures according to the present embodiment and FIG. 8 is a diagram depicting a table of information for a link that has been set.

FIG. 7 shows the procedure order when anchor setting and link setting are executed completely independently. As in FIG. 2 various kinds of initialization processing are first executed (S40) and the moving image data are incorporated. Next as the anchor information which was set in [1] is incorporated from the anchor information storage portion 21 (S42), link information that has already been set is incorporated from the link information storage portion 22.

Next, while determining the anchor information of another frame by interpolation calculation based on the anchor information of the two outer standard frames and the middle standard frame (S44), the anchor information is continually displayed in synchrony with the play-back of the moving image. This is now in the waiting state for input from the user at the user operation portion 4.

Here on a moving image or after pausing a moving image, if the user clicks an anchor region and presses the "Create/Replace Link" button, the creation of link information for that anchor is executed (S47). For instance, when a fish in an aquarium is clicked, the candidate information such as a text or an image to be linked to that fish appears on the screen, then the text or the like which the user has chosen is linked to the anchor of the fish (more precisely, to the fish as an object included in the anchor). In a case where there are no candidates the user himself can input a character string and link this. FIG. 8 shows a state wherein information in text format "anchor1. txt" has been linked to an anchor "anchor1" and a bit-map image "anchor2. bmp" has been similarly linked to an anchor "anchor2". When the link information has been determined in this way, the contents of the link are preserved in the link information storage portion 22 and the state returns to waiting for user input.

If in S46 the user presses the "link retrieval" button and specifies an anchor, the link information corresponding to that anchor is retrieved and displayed (S49). In FIG. 8 for instance, for the fish in anchor 1 the name and length and other characteristics of the fish are displayed by a character string and for the fish in anchor 2 information such as a photograph of the sea in which the fish actually lives is displayed. Since the link operation can be confirmed from this display the user can complete the creation of contents at this point. The contents can also be merchandized, for instance by preservation on a recording medium such as a CD-ROM. When shipped as merchandise, the anchor region is generally replaced with a non-displayed anchor non-display mode.

The anchor and link settings have here been described as independent processes, but for instance by creating a "return to anchor setting" button to be displayed on the screen during link setting it becomes possible to change freely between the two processes and editing is made easier.

[3] UI for Anchor Setting

Figure 9:
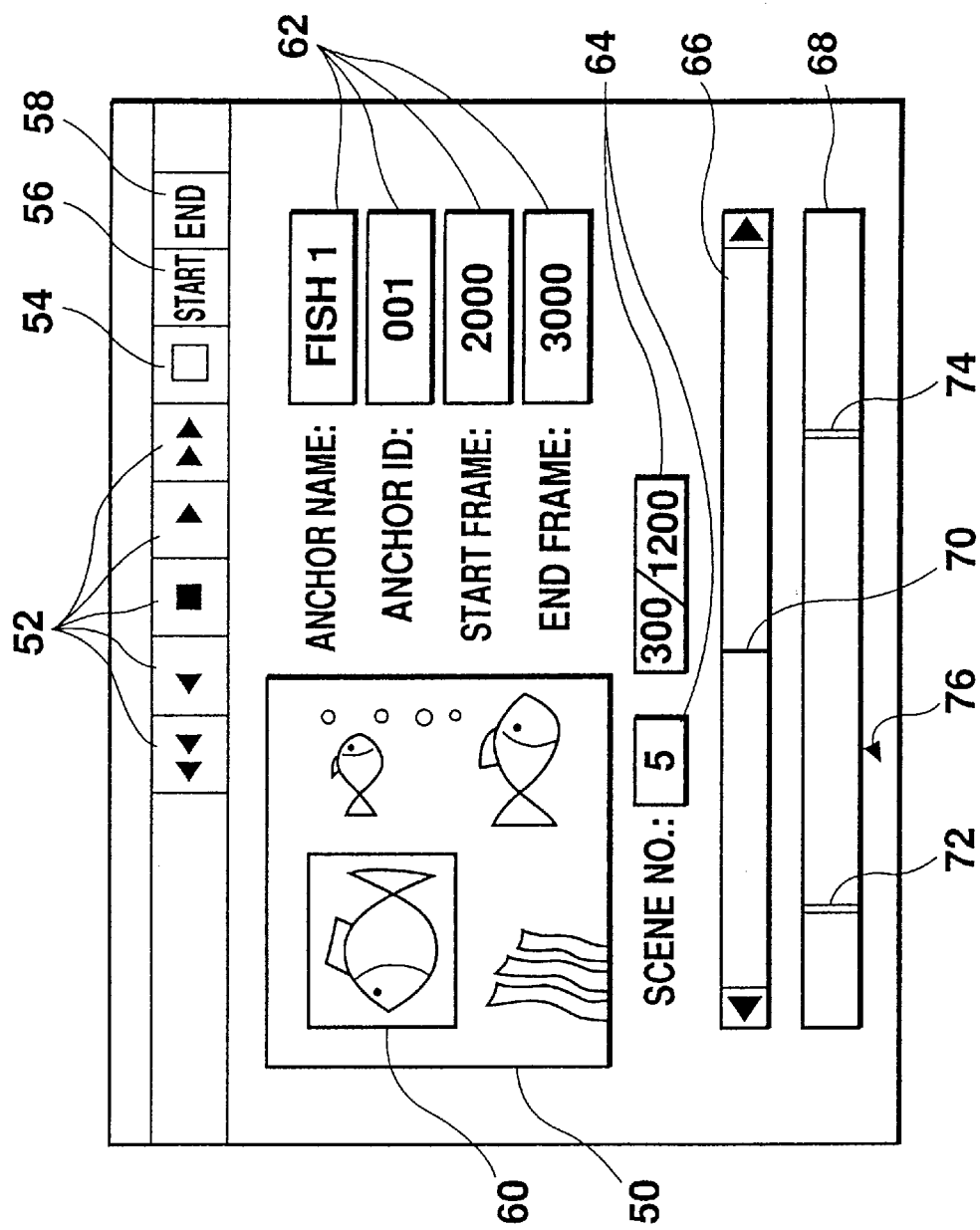
FIG. 9 shows an example of a UI screen for anchor setting.

FIG. 9 is a diagram showing an example of a UI screen for anchor setting. In the diagram the moving image to be the object of the process is displayed in an image display region 50. The top row of black buttons 52 are the object buttons which give direct instructions to the video such as play-back and stop. Next to these are a rectangular button 54 to set an anchor region for a frame displayed in the image display region, and similarly a start frame specification button 56 and an end frame specification button 58 for specifying a displayed frame as a start frame or an end frame. In the diagram an anchor 60 has been set for one of the fish.

On the center right side of the screen is an anchor-related box group 62 to display the name, ID, start frame number and end frame number of the anchor to be set or revised. Below the image display region 50 is a scene-related box group 64 for displaying the number of the scene including the frame presently being displayed and the serial number of the frame within the scene. Below this is a box 66 for moving an image very slightly forward or backward when editing. The image moves forward when the button on the right end is pressed and backward when the button on the left end is pressed. The position of the frame presently being displayed within the scene is being displayed by a vertical line 70. Below this box is a box 68 to display the positions of the start frame and end frame within the scene. The positions of the start frame and end frame are displayed respectively by the double vertical lines 72 and 74, and between these the position of the middle standard frame is being displayed by a triangular symbol 76.

In the same diagram, using the scene number as a pointer the user first advances the video tape as far as the front of the scene for which he wishes to set an anchor. In this case for instance in a film of an aquarium comprising a plurality of scenes, the film has proceeded to scene No. 5 showing a fish tank. Here the user presses the right end button of box 66 and advances the moving image by one frame at a time. When the first frame of the anchor which is to be set appears, the user presses the start frame specification button 56 and registers this frame. Now the double vertical line 72 displaying the position of the start frame appears at the corresponding place in box 66. Here the user presses the rectangular button 54 and in the image display region 50 clicks the left upper point and right upper point of the anchor region he intends to set with the mouse. This ends the anchor setting for the start frame. Thereafter the moving image is advanced and in the same way the end frame is registered and an anchor set.

When it detects the completion of the setting at the two outer frames, the anchor information interpolation portion 12 of the present apparatus automatically substitutes the anchor information into equation 1 and begins calculation. Here when the user for instance returns to the start frame and advances the moving image one frame at a time, the anchor information interpolation portion 12 determines the time corresponding to the frame presently being displayed and displays an anchor region based on an estimated result corresponding to this time. If the anchor region displayed is misaligned, the user again presses the rectangular button 54 and executes revision of the region. After revision the triangular symbol 76 appears at the point corresponding to this frame.

Since this UI actually displays the anchor information above the moving image data, editing results can be confirmed at real time and revisions can be simply executed.

The above is an outline of the present embodiment. The following refinements and alterations and the like are envisaged in regard to the present embodiment.

(1) Text anchor setting

Text anchor setting is executed by the text anchor editing portion 111 in FIG. 1. First on the screen, text data is edited and superimposed on the moving image and an anchor is set. A single region from a played-back image is not specified as in a normal anchor setting, but a created text is placed on the image and an anchor region is set enclosing this text as appropriate. Methods such as directly inserting annotation onto a video film for instance have hitherto been generally used, but in such cases subsequent deletion of the annotation when re-editing is awkward. The present embodiment resolves this difficulty.

When a text anchor has been set, the anchor information is also stored in the anchor information table. However, in the table shown in FIG. 3 "frame" changes to "text" and a text name is entered in the column.

Linking of related information is also possible for a text anchor. For instance for the aquarium scene in FIG. 9 a text "Fish of the South Seas" may be pasted, to which a text such as "There are many brightly colored fish in the South Seas . . . " can be linked.

(2) Replacement of Cursor Display State

Replacement of the cursor display state is executed by the cursor replacement portion 300 in FIG. 1. This function is particularly useful for an anchor non-display mode for instance when the contents are to be used by the end users. In order to execute this function the cursor replacement portion 300 has a position acquisition program for acquiring the cursor position at any time, a judgment program for judging whether an acquired position is included by one of the anchor regions, and a replacement portion to decide in what way the display state of the cursor is to be replaced when the cursor has entered an anchor region and to actually replace the shape or such feature of the cursor according to this decision.

When replacing a cursor, there are cases in which it is not intended to change the replacement contents for each anchor and cases in which it is intended. In the former, there is for instance a method for replacing a cursor ordinarily shown as a + symbol with ⊙ or for increasing the cursor brightness without depending upon the anchor region into which the cursor has entered. This aspect is particularly beneficial in cases where the movement and shape of the target are changing rapidly and the changes of the anchor region are severe.

In the latter case, it is envisaged that the anchor ID of the anchor region into which the cursor has entered is retrieved from the replacement program and is displayed in the cursor position instead of the cursor. For instance, when the cursor has entered the anchor region of a certain fish, the contents of the anchor target can be displayed with the cursor as a "shark" or suchlike. According to this mode the user can learn the name of a fish without even needing to click the fish.

(3) Clear Specification of Middle standard frames

In the present embodiment the two outer frames were first determined, but a case requiring revision is conceivable such as a case in which the movement of a target is erratic. In such a case, from the outset frames other than the start frame and end frame also receive clear or intentional anchor region specification. For instance in the UI in FIG. 9 in addition to the start frame specification button 56 and the end frame specification button 58 a middle standard frame button may be provided. Since this frame is used as a standard frame from the outset, interpolation calculation can be regarded as starting from the state shown in FIG. 6.

(4) Non-rectangular Anchor Regions

Anchor regions need not be limited to rectangles. For instance in the case of a circle or an ellipse a region may be specified according to the three coordinates of the major axis, the minor axis and the center. For a polygon the coordinates of each vertex may be used. When the perimeter itself of a target is to be the anchor region, the region can be specified according to a coordinate of one point above the perimeter and a chain code expressed from that point.

(5) Adoption of Non-linear Interpolation

In the present embodiment for maximum simplicity linear interpolation was used but of course non-linear interpolation is acceptable. The equation used for interpolation can be determined according to experiments tailored to the characteristics of the moving image to be processed.

EMBODIMENT 2

In the first embodiment calculation of anchor information was executed automatically by interpolation and revision was executed manually. An apparatus which, based on an analysis of a moving image, automatically sets an anchor beforehand with a certain number of frames as standard frames and utilizes the interpolation method of the first embodiment between these standard frames will now be described. In this aspect, since a frame equivalent to the middle standard frame of the first embodiment exists from the outset the manual labor required for revision is reduced.

[Configuration]

Figure 10:
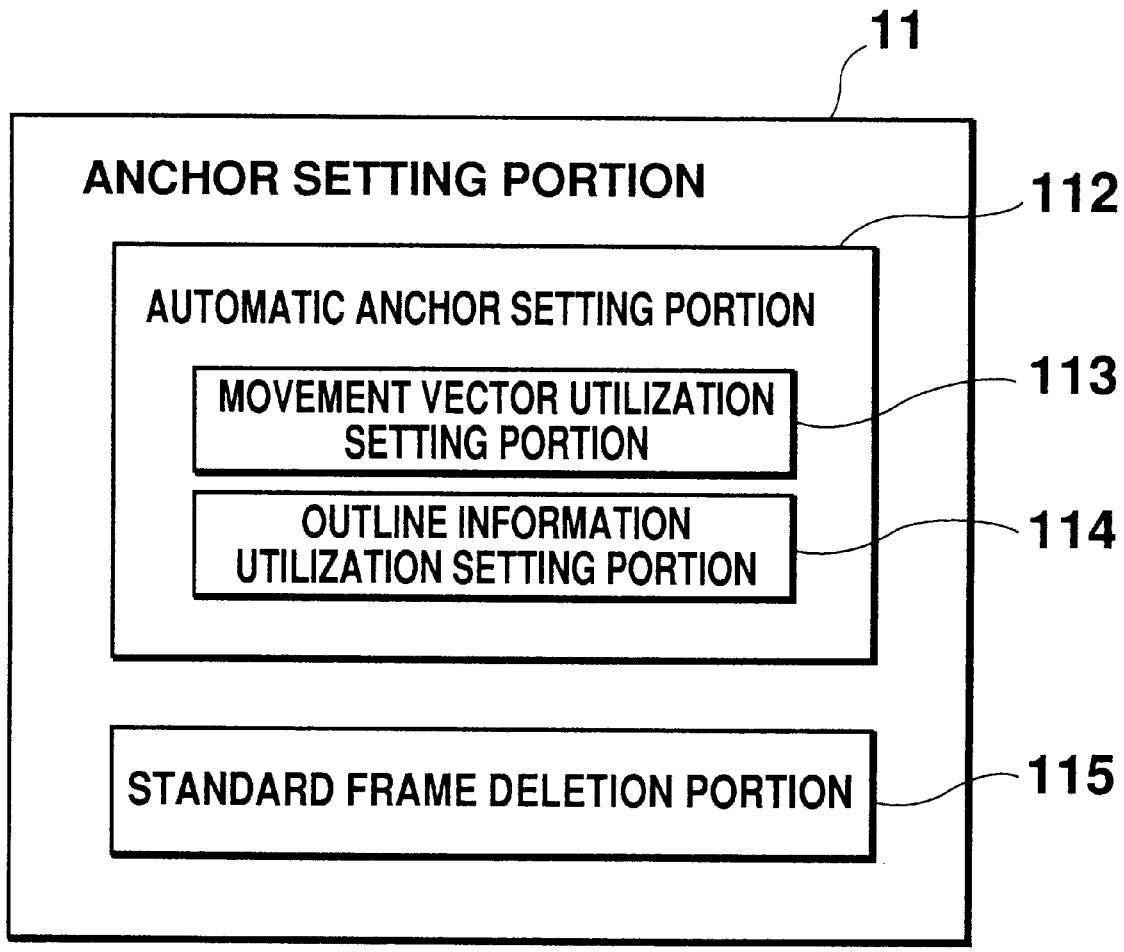
FIG. 10 is a block diagram of an anchor setting portion of a moving image hypermedia apparatus in a second embodiment.

FIG. 10 is a block diagram of an anchor setting portion 11 of a moving image hypermedia apparatus in the present embodiment. Other than the anchor setting portion 11 the configuration is the same as shown in FIG. 1. In FIG. 10 an automatic anchor setting portion 112 has a moving vector utilization setting portion 113 and an outline information utilization setting portion 114. Hitherto only one of these 2 setting portions has been implemented but in the present embodiment both are implemented and either of the two can be chosen to suit the given circumstances. Furthermore, as will be explained below the standard frame deletion portion 115 returns to non-standard frames those frames among the frames set by the automatic anchor setting portion 112 which are redundant.

[Processing Operation]

[1] Automatic Anchor Setting using Movement Vectors

The feature of processing in this embodiment lies in a two level process for increasing the tracking precision of the anchor by first determining the movement vector of the anchor from the start frame to the end frame, and then in due course judging the agreement between the supposed movement path of the anchor and the movement vector.

1. Obtaining a Movement Vector

The times of the start frame and end frame are given as t0 and t1 respectively. In addition to these a number of non-standard frames are first replaced with standard frames. For simplicity let us suppose that every other five frames are replaced and hereafter let us normalize the time-lapse between standard frames as 1. In order to determine the movement vector of a specific anchor in the period from the start frame to the end frame, block matching is executed with an image region near to the center of the anchor as a block. A frame corresponding to a given time t is here expressed as frame (t).

Figure 11:
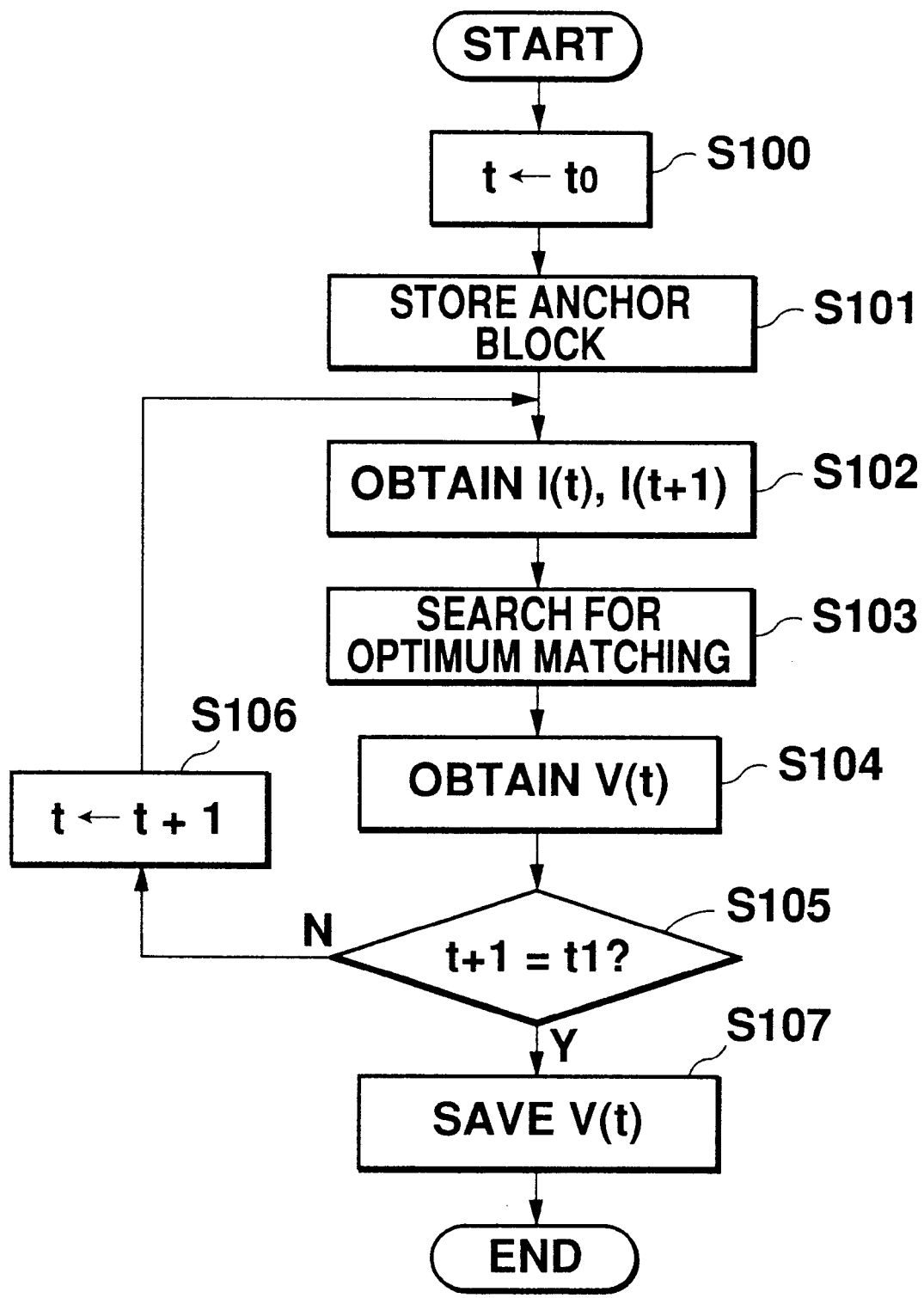
FIG. 11 is a flowchart showing an acquisition procedure for a movement vector in the second embodiment.

FIG. 11 is a flowchart showing an acquisition procedure for a movement vector in the present embodiment. As in the diagram a time counter t is first advanced or in some cases returned to t0 (S100). Next the anchor for which the movement vector is to be obtained is specified from among the anchors set at the start frame. The movement vector utilization setting portion 113 stores the region including the center of the specified anchor as a block to be used when block matching (hereinafter referred to as an "anchor block") (S101). Next the image data I (t) of frame (t) and the image data I (t+1) of frame (t+1) are obtained (S102). I (t) is the collective data of the pixel values p for each of the pixels included in the frame.

Following this the optimum matching is searched for while moving the anchor block within the frame (t+1) (S103). Since all the pixel values for the anchor block itself are identified from I (t) the anchor block is placed at a given point in the frame (t+1), the square deviation of the pixel values is calculated from the corresponding pixels and this is integrated within the entire anchor block region. This integration is executed while gradually moving the anchor block and the position where the integration value is lowest is judged to be the motion target (destination) of the anchor block.

Once the motion target has been identified, since the motion quantity and motion direction from the anchor block at frame (t) to the anchor block at frame (t+1) are confirmed, a movement vector V (t) is obtained (S104). Here it is judged whether or not t+1 has reached the time t1 of the end frame (S105) and if it has not been reached t is incremented (S106) and the movement vector is repeatedly obtained. Once t+1 is equivalent to t1 the V (t) hitherto obtained is preserved (S107) and processing ends.

Figure 12:
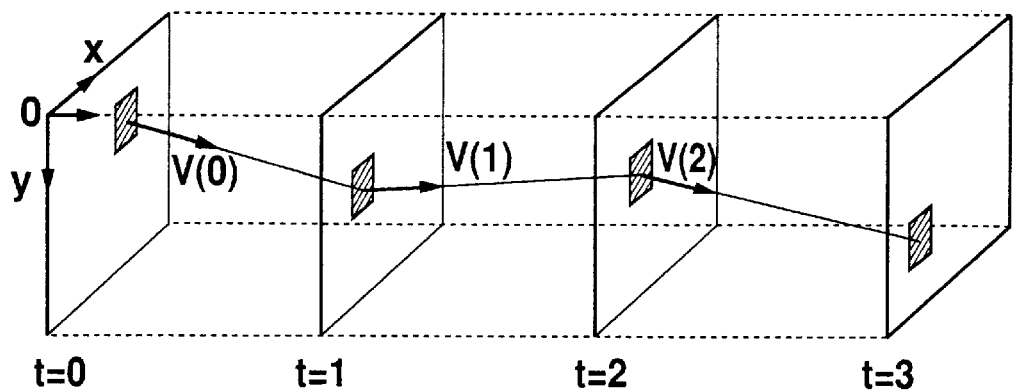
FIG. 12 shows an example of a movement vector V (0)~V (2) obtained when t0=0, t1=3 in FIG. 11.

FIG. 12 shows an example of a movement vector V (0)~V (2) obtained when t0=0 and t1=3. As the diagram shows, V (t) can be expressed by the three components (x, y, t) according to x and y determined by the length and breadth on the screen and t determined by time direction.

2. Judgment of Agreement Level

Figure 13:
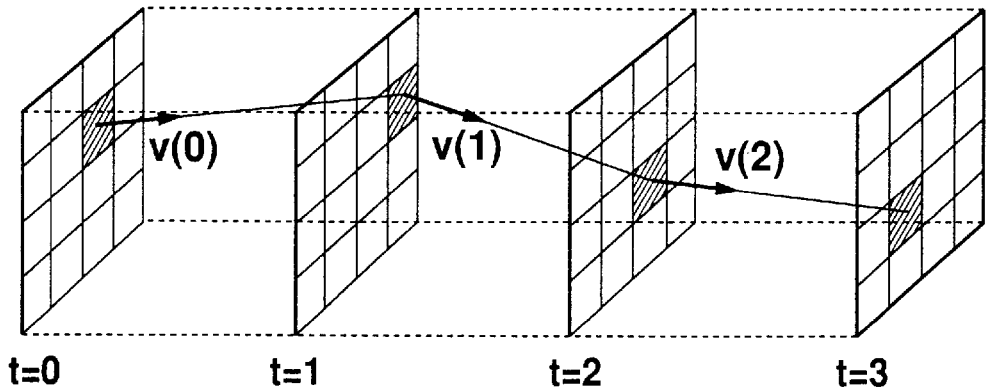
FIG. 13 is a diagram depicting one of the paths which the anchor might have followed.

Each frame is divided into blocks of similar size as the anchor blocks created when the movement vector is obtained and all paths which the anchor could have followed are picked out. FIG. 13 is a diagram depicting one of these paths. In this diagram, the frames are divided into 16 blocks and the starting point of the path at the start frame and the end point of the path at the end frame are in agreement with the anchor block shown in FIG. 11. Under these conditions, all paths will thus be 16×16. Next in each section of these possible paths (hereinafter "supposed paths") the vector v (t) shown in FIG. 13 (hereinafter "path vector") is defined. The path vector is determined by the direction when following a supposed path from one frame to the next frame. v (t) is also described with the 3 components (x, y, t).

The angle formed in each section by V (t) and v (t) is defined as θt, and f (t)=cos θt is calculated according to the following equation using the inner product.

$$f(t)=(V(t), v(t))/|V(t)|\cdot|v(t)| \qquad \text{(Equation 2)}$$

Figure 14:
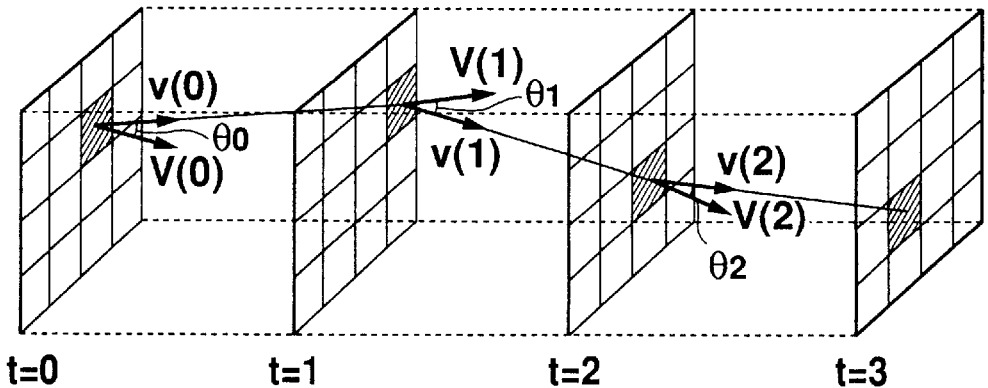
FIG. 14 is a diagram showing V (t) of FIG. 12 added to v (t) of FIG. 13.

FIG. 14 is a diagram depicting V (t) of FIG. 12 added to v (t) of FIG. 13, showing the meaning of θt. When f (t) of equation 2 is great the level of agreement between the supposed path and the movement vector in that section is high, but even if the level of agreement in one section is at maximum, if the levels of agreement in the other sections are extremely low, the level of agreement for the whole must be regarded as low. Here while including the level of agreement at each section, the following evaluation equation is inserted in order to evaluate the level of agreement of the whole:

$$g(t)=\max \{f(t-1)+g(t-1)\} \qquad \text{(Equation 3)}$$

A supposed path having the highest level of agreement can usually be pinpointed by recurrently calculating equation 3. Since the supposed path having the highest level of agreement for the whole can be pinpointed if this calculation is executed right up to the end frame, this path is regarded as the motion path of the anchor. Thereafter the points at which this motion path intersects each standard frame are taken as those at which the anchor will exist and automatic anchor setting is executed. The set anchor information may be added to the anchor information table shown in FIG. 3.

According to the present aspect, since judgment includes not only the movement vector which ordinarily accompanies a certain level of deviation but also the suitability of the path, tracking precision is improved. Therefore anchor information of a middle standard frame which has been set beforehand is accurate, and man-hours required for setting and revision the anchor are greatly reduced for the user. Furthermore, according to the method in the first embodiment, anchor information for frames other than standard frames may be successively determined from interpolation calculation.

[2] Automatic Anchor Setting based on Utilization of Outline Information

As another method of automatic anchor setting an anchor can be tracked based on the motions of the outline of a target. At the outline information utilization portion 114 an outline image of each frame is generated by the same repetition process shown in FIG. 11. An outline image is composed of pels that have either zero or one as their values. If the pels on the outline are to have one as their values, other pels would have zero as their values. The outline image can be generated with a compass-gradient-type filter or such like. When the outline image is determined, anchor tracking can thereafter be executed taking the anchor motion as identical to the motion of the target.

[3] Deletion of Unnecessary Standard Frames

In the above example a standard frame was set every five frames. However, for instance when a target moves in a straight line at constant velocity, a start frame and end frame alone are sufficient. Even in a case in which a target is not moving in a straight line at constant velocity from the start frame to the end frame, for the period during which it does move in this way only two outer standard frames are needed. As the number of standard frames decreases, so the number of supposed paths also decreases and the calculation is consequently less laborious.

Figure 15:
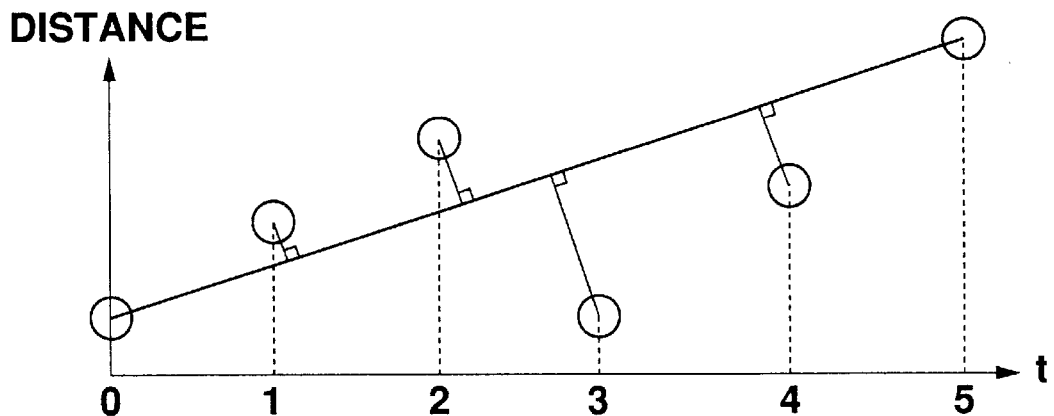
FIG. 15 is a diagram depicting the deletion of a standard frame in the second embodiment.
Figure 16:
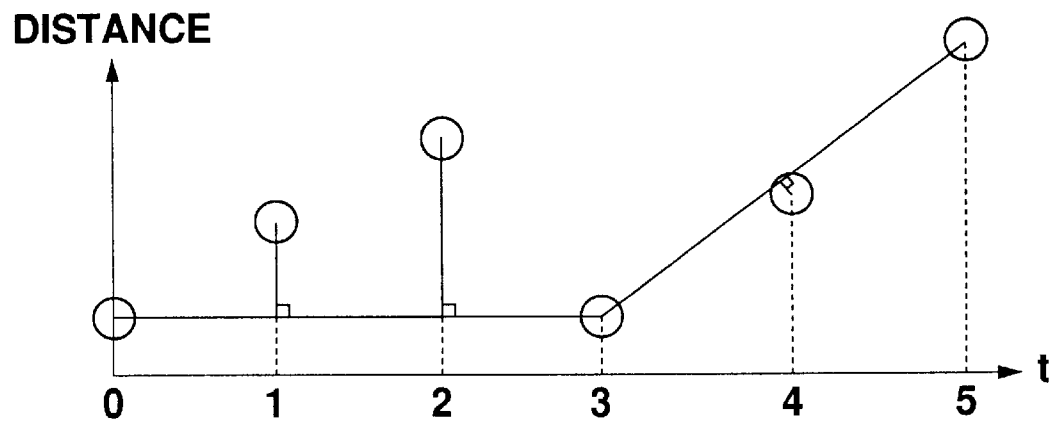
FIG. 16 is a diagram depicting the deletion of a standard frame in the second embodiment.
Figure 17:
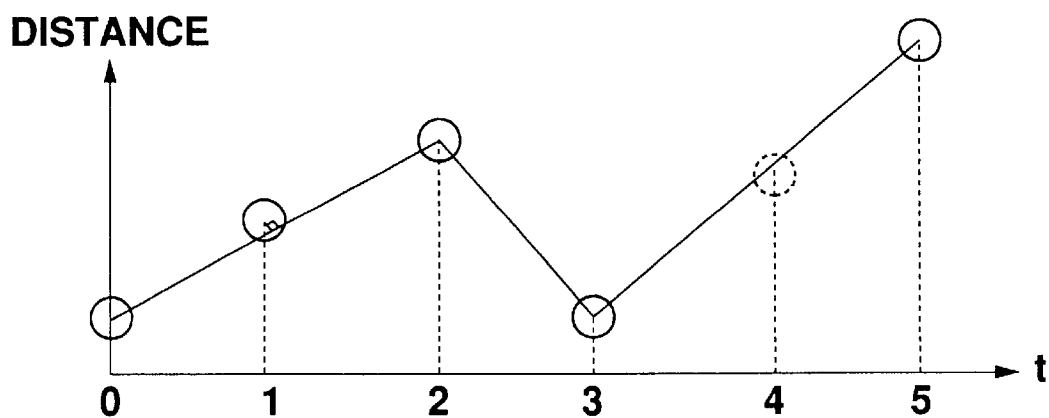
FIG. 17 is a diagram depicting the deletion of a standard frame in the second embodiment.

In this respect the standard frame deletion portion 115 executes deletion of unnecessary standard frames. FIGS. 15–17 are diagrams depicting the deletion of a standard frame in the second embodiment. The horizontal axis in these diagrams shows time, and the vertical axis shows the distance from the original points of the x-y coordinates set on the frame. In addition, the ○ symbol in these diagrams shows the anchor region in schematic form. Deletion is executed in the following order.

[FIG. 15]

At first six standard frames are set including the two outer frames. Here the anchor of the start frame and the anchor of the end frame are joined with a straight line and the distance of each anchor from this straight line is calculated. When there is an anchor with a distance less than the designated value, the standard frame having this anchor is deleted. The case shown in this diagram is one in which no anchors have been deleted. Next the anchor farthest from the straight line (hereinafter the farthest anchor) is found out. Here the anchor at t=3 is the farthest anchor.

[FIG. 16]

The straight line is erased and the anchor at the start frame, the farthest anchor, and the anchor at the end frame are joined by a polygonal line and the distances from the anchors to this line are once more determined. The anchor at t=4 which had a distance less than the designated value is deleted. The anchor at t=2 now becomes the farthest anchor.

[FIG. 17]

The regular line is revised so as to pass through the new farthest anchor. Here the anchor at t=1 which had a distance from the new regular line which was less than the designated value is deleted. This ends the process.

In this example two standard frames were deleted. When there are many standard frames at the beginning of the process, this sequence may be repeated: 1. deletion of standard frame less than the designated value, 2. finding out the farthest anchor, 3. revision of regular line.

The above is an outline of the present embodiment. The following refinements or modifications are envisaged for this embodiment.

(1) Modification of Equation 2

Equation 2 employed $f(t) = \cos \theta t$ but of course other equations may be employed. Functions of which value increases when $\theta t$ increases can be applicable.

(2) Block-taking

In FIG. 12 an anchor block was determined so as to include the central vicinity of the anchor region, but other methods of determination are acceptable. For instance an anchor region can itself be designated as a block. Similarly in FIG. 13 a block can be determined without regard to the size of the anchor block.

What is claimed is:

1. A moving image anchor setting apparatus for inputting a moving image and setting an anchor to the moving image, comprising:

a frame specification portion for specifying a first standard frame and a second standard frame from a plurality of frames constituting the moving image;

an anchor setting portion for setting an anchor by selecting a particular region overlapping a target object within one of the first standard frame and the second standard frame to be an anchor region, the anchor associated with anchor information relating to the anchor region;

an anchor estimating portion for estimating anchor information for a frame existing between the first standard frame and the second standard frame based on the respective anchor information determined for the first and second standard frames;

the anchor estimating portion estimates anchor information in the non-standard frame by interpolating using the anchor information determined for the first standard frame and the anchor information for the second standard frame;

wherein the frame existing between the first standard frame and the second standard frame is a non-standard frame; and an anchor information editing portion for adding revisions to the anchor information estimated for the non-standard frame; and wherein the anchor estimating portion promotes a non-standard frame, having revised anchor information, to standard frame, and thereafter, when estimating anchor information for other frames, executes interpolation between adjacent standard frames.

2. A moving image anchor setting apparatus according to claim 1, wherein the anchor setting portion includes an automatic anchor setting portion, wherein the automatic anchor setting portion chooses a given number of frames from an anchor setting period and renders them new standard frames, and thereafter automatically sets anchor information for the new standard frames by tracking a position of an anchor based on movement of an outline of the target object.

3. A moving image anchor setting apparatus according to claim 2, wherein for each section of the anchor setting period, partitioned by a standard frame, the anchor estimating portion executes an interpolation calculation of anchor information between frames positioned at both ends of a section and estimates the anchor information for a non-standard frame included in the section.

4. A moving image anchor setting apparatus according to claim 1, wherein the anchor setting portion includes an automatic anchor setting portion, wherein the automatic anchor setting portion chooses a given number of frames from an anchor setting period and renders them new standard frames, and thereafter automatically sets anchor information for the new standard frame by tracking a position of an anchor based on a movement vector of the target object.

5. A moving image anchor setting apparatus according to claim 4, wherein the automatic anchor setting portion uses each section of the anchor setting period, partitioned by the new standard frames, as a unit judgment period; and wherein in each unit judgment period, a level of agreement between an anchor movement vector and each path of the anchor within the anchor setting period is judged;

judgment results spanning the anchor setting period are totaled, and from a total result, a path having a highest level of agreement is taken as a motion path of the anchor.

6. A moving image anchor setting apparatus according to claim 5, wherein the level of agreement is a function of an angle formed by the path and the movement vector, the function having no extremums while an angle changes from 0° to 180°; and the total result is determined according to a sum of function values determined for each unit judgment period.

7. A moving image anchor setting apparatus according to claim 4, wherein for each section of the anchor setting period, partitioned by a standard frame, the anchor estimating portion executes an interpolation calculation of anchor information between frames positioned at both ends of a section and estimates the anchor information for a non-standard frame included in the section.

8. A moving image anchor setting apparatus according to claim 4, wherein for each section of the anchor setting period partitioned by the standard frame, the anchor estimating portion executes interpolation calculation of anchor information between frames positioned at both ends of the section and estimates the anchor information for a non-standard frame included in the section.

9. A moving image anchor setting apparatus according to claim 1, wherein the anchor setting portion includes a text anchor setting portion; and when corresponding text in the first standard frame and second standard frame is specified, the text anchor setting portion sets an anchor having the corresponding text as its contents.

10. A moving image anchor setting apparatus according to claim 1, further comprising:

a cursor replacement portion for replacing a display state of a cursor when the cursor has entered a given anchor region.

11. A moving image anchor setting apparatus according to claim 1, wherein a cursor replacement portion replaces the display state of the cursor to accompany a display of a name of an anchor region into which the cursor has entered.

12. A moving image anchor setting apparatus according to claim 1, wherein said moving image anchor setting apparatus is part of a moving image hypermedia apparatus, said moving image hypermedia apparatus further including, an anchor information storage portion for storing anchor information set by said moving image anchor setting apparatus; and a link setting portion for linking stored anchor information and related data;

a link information storage portion for storing set link information; and a link retrieval portion for retrieving from a given anchor, related data linked to the given anchor.

13. A moving image anchor setting apparatus for inputting a moving image and setting an anchor to the moving image, comprising:

a frame specification portion for specifying a first standard frame and a second standard frame from a plurality of frames constituting the moving image;

an anchor setting portion for setting an anchor by selecting a particular region overlapping a target object within one of the first standard frame and the second standard frame to be an anchor region, the anchor associated with anchor information relating to the anchor region;

an anchor estimating portion for estimating anchor information for a frame existing between the first standard frame and the second standard frame based on the respective anchor information determined for the first and second standard frames;

the anchor estimating portion estimates anchor information in the non-standard frame by interpolating using the anchor information determined for the first standard frame and the anchor information for the second standard frame;

the anchor setting portion includes an automatic anchor setting portion, wherein the automatic anchor setting portion chooses a given number of frames from an anchor setting period and renders them new standard frames, and thereafter automatically sets anchor information for the new standard frames by tracking a position of an anchor based on movement of an outline of the target object;

the anchor setting portion includes a standard frame deletion portion; and when anchor information at a particular standard frame is acquired having a designated permissible deviation value from an interpolation calculation of anchor information in other standard frames, the standard frame deletion portion demotes the particular standard frame to a non-standard frame.

14. A moving image anchor setting apparatus for inputting a moving image and setting an anchor to the moving image, comprising:

a frame specification portion for specifying a first standard frame and a second standard frame from a plurality of frames constituting the moving image;

an anchor setting portion for setting an anchor by selecting a particular region overlapping a target object within one of the first standard frame and the second standard frame to be an anchor region, the anchor associated with anchor information relating to the anchor region;

an anchor estimating portion for estimating anchor information for a frame existing between the first standard frame and the second standard frame based on the respective anchor information determined for the first and second standard frames;

the anchor estimating portion estimates anchor information in the non-standard frame by interpolating using the anchor information determined for the first standard frame and the anchor information for the second standard frame;

the anchor setting portion includes an automatic anchor setting portion, wherein the automatic anchor setting portion chooses a given number of frames from an anchor setting period and renders them new standard frames, and thereafter automatically sets anchor information for the new standard frame by tracking a position of an anchor based on a movement vector of the target object;

the anchor setting portion includes a standard frame deletion portion; and when anchor information at a particular standard frame is acquired having a designated permissible deviation value from an interpolation calculation of anchor information in other standard frames, the standard frame deletion portion demotes the particular standard frame to a non-standard frame.

15. A moving image anchor setting apparatus, comprising:

an anchor information setting portion for designating one or more standard frames from among a plurality of frames constituting a moving image to set anchor information to each of the one or more standard frames;

an anchor estimating portion for estimating anchor information of a non-standard frame based on the set anchor information;

a modifier for modifying the estimated anchor information of the non-standard frame; and an anchor information editing portion for changing the non-standard frame whose anchor information was modified to a standard frame.

16. A moving image anchor setting apparatus, comprising:

an anchor information setting portion for designating one or more standard frames from among a plurality of frames constituting a moving image to set anchor information to each of the one or more standard frames;

an anchor estimating portion for estimating anchor information of a non-standard frame based on the set anchor information;

a judgement portion for judging whether or not the anchor information set to one or more standard frames is able to be calculated within a predetermined error tolerance, based on anchor information set to other standard frame; and a standard frame deleting portion for changing the one or more standard frames to non-standard frames when the judgement portion judges the anchor information is able to be calculated within the predetermined error tolerance.

* * * * *